Nov. 21, 1967  W. R. JAMES  3,354,394
RECEPTACLE FOR TRANSISTORS OR INTEGRATED CIRCUITS TO BE TESTED
Original Filed Aug. 6, 1964
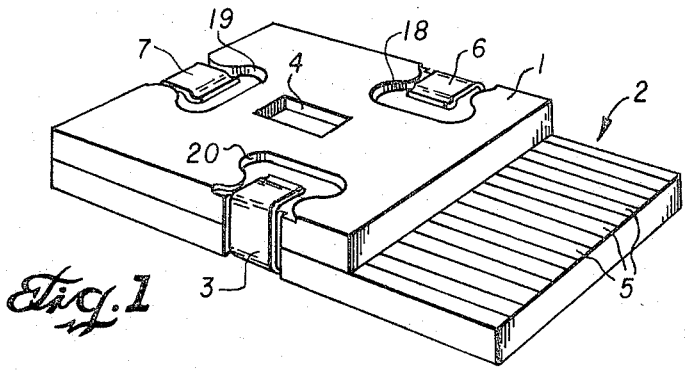
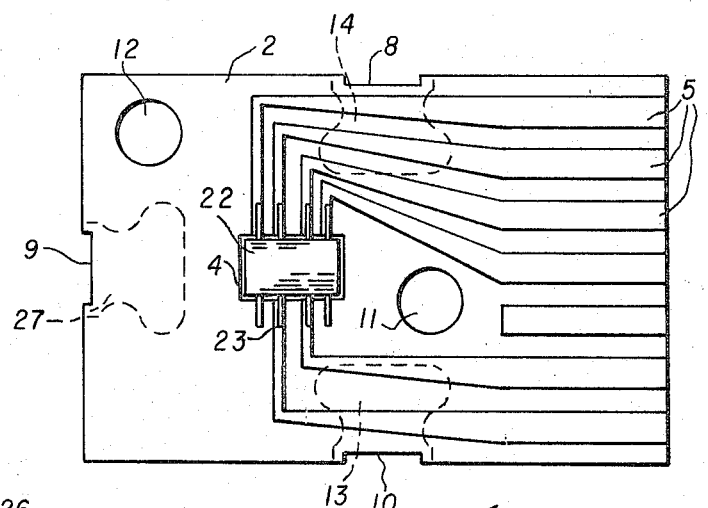
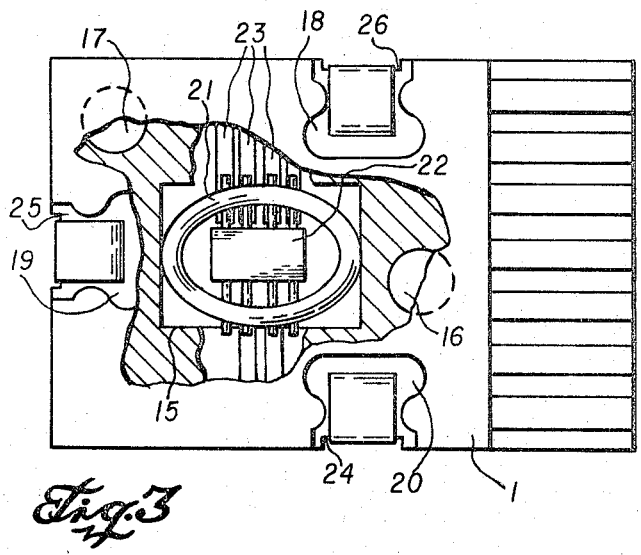
William R. James
INVENTOR.
BY John D. Graham
ATTORNEY 3,354,394
RECEPTACLE FOR TRANSISTORS OR
INTEGRATED CIRCUITS TO BE TESTED
William R. James, Richardson, Tex., assignor to Texas
Instruments Incorporated, Dallas, Tex., a corporation
of Delaware
Continuation of application Ser. No. 387,863, Aug. 6,
1964. This application Jan. 12, 1967, Ser. No. 608,940.
1 Claim. (Cl. 324—158)

This is a continuation application of Serial No. 387,863 filed August 6, 1964 and now abandoned.

This invention relates to receptacles, or "carriers," for transporting or handling transistors or integrated circuits, and more particularly to a receptacle which can be used for the electrical testing of substantially flat transistors and integrated circuits.

Previous attempts to build a suitable receptacle have encountered difficulties with obtaining the right base material, i.e., one which would not be bulky to handle and could withstand the temperature extremes at which the device is to be tested. Attempts have also been made to use spring contacts or other mechanical means for making contact to the leads of the device, all of which can be easily damaged and are generally unreliable.

It is, therefore, the principal object of this invention to provide a reliable, inexpensive receptacle which can withstand repeated insertions into a test socket over a wide temperature range.

In accordance with the invention, the receptacle body is made of a ceramic material in two separable sections, a top section and a bottom section. On the bottom section some electrically conductive metal, such as silver, nickel, or the like, is coated in strips in such a manner that the leads of the device to be tested may be placed against the strips and held firmly in place therewith by the use of an "O" ring located in the top section. The receptacle is so designed that the "O" ring, preferably made of silicone rubber or the like, exerts pressure on the leads of the device to be tested to insure a good, reliable contact with the metallized strips on the bottom section. Interlocking parts on the top and bottom sections tend to prevent incorrect assembly of the receptacle, the two sections being held securely together by three spring clips. For higher temperature operation than that of a silicone rubber "O" ring, the testing could be performed by electrically isolated knit metallic pads being placed in the cavity provided for the "O" ring.

The novel features characteristic of the invention are set forth in the appended claims. The invention itself, however, along with other objects and advantages thereof, may be best understood from the following detailed description and appended claims when read in conjunction with the accompanying drawing in which the same numeral designations in the difference figures of the drawing indicate identical parts, and wherein:

FIGURE 1 is a pictorial view of a receptacle for transistors or integrated circuits, constructed in accordance with this invention;

FIGURE 2 is a plan view of the bottom section of the body of the receptacle, indicated by the numeral 2 in FIGURE 1;

FIGURE 3 is a partially cut-away plan view of the receptacle as shown in FIGURE 1.

FIGURE 1 illustrates the complete receptacle, top section 1 being held in place against bottom section 2 through the use of clamping means, spring clips 3, 6 and 7. Also, the electrically conductive strips 5 are partially exposed and extend to one edge of bottom section 2 so that the exposed area of said section can be inserted into a test socket (not shown). Receiver 4 in which the device 22 to be tested is lodged is illustrated as extending through the top section 1 and the bottom section 2, the device 22 to be tested (see FIGURES 2 and 3) being sandwiched in between.

Referring now to FIGURE 2, the receiver 4, partially edged by the metallized strips 5, is so constructed as to accommodate a device 22 to be tested, the metallized strips 5 being so disposed around the edge of the receiver as to have similar spaced-apart dimensions as do the leads 23 of the device 22 with which they come in electrical contact for the testing of the device. The strips 5 extend to or near the edge of the section 2 in order that the receptacle may be inserted into a test socket or the like for testing the device. Circular indents 11 and 12 are designed to receive the protrusions 16 and 17, respectively, in the top section 1 of the receptacle (shown in FIGURE 3) to align said top section 1 with bottom section 2. Notches 8, 9 and 10 and spring-receiving indents 13, 14 and 27 are so built in section 2, along with corresponding notches 24, 25 and 26 and indents 18, 19 and 20 in section 1 (see FIGURE 3) that spring clips 3, 6 and 7, as shown in FIGURE 1, are used to hold both sections locked together as a unit receptacle.

FIGURE 3 illustrates a partially cut-away plan view of the receptacle, and shows how "O" ring 21, a resilient silicone rubber, for example, is placed in the receiver 15. Section 1 is attached to section 2 by clips 3, 6 and 7, with the "O" ring 21 pressing against the leads 23 to secure them to the metallized strips 5.

While the drawings illustrate one embodiment of the invention, designed for use with an integrated circuit device, it should be appreciated that other embodiments would include carriers for testing other electrical devices with any number of leads, such as diodes, rectifiers, transistors, and the like, the conductive strips beng provided and arranged in different numbers, manner or sequence. Numerous other constructions may be devised by those skilled in the art without departing from the spirit and scope of the invention as defined by the appended claim.

What is claimed is:

A receptacle adapted to receive a semiconductor device for testing, said semiconductor device having a plurality of external leads, said receptacle comprising:

(a) separable top and bottom sections of substantial electrically non-conductive material;

(b) said top section having a cavity receiver portion within a major face thereof, said cavity receiver portion having resilient pressing means therein;

(c) said bottom section having an opening in a major face thereof and extending vertically throughout said bottom section including another opening extending vertically from said cavity receiver portion throughout said top section, both of said openings being superimposed whereby said semiconductor device is exposed within said opening;

(d) a plurality of metallic strips in spaced-apart relationship upon said major face of said bottom section, said plurality of metallic strips extending from said opening and having end portions terminating at a single surface area of said major face;

(e) said top section covering said bottom section and so positioned to enable said resilient pressing means to effect contact between said plurality of external leads of said semiconductor device and said plurality of metallic strips;

(f) said top section being of smaller area than said bottom section so that said end portions of said metallic strips at said single surface area remain uncovered by said top section, thereby to enable said single surface area to be inserted in a test socket; and (g) a removable spring clamp for locking said top and bottom sections together.

References Cited

UNITED STATES PATENTS

| | | | |
|---|---|---|---|
| 2,486,711 | 11/1949 | Harris | 206—46 |
| 2,824,291 | 2/1958 | McLean | 324—158 |
| 2,858,515 | 10/1958 | Thunander | 339—17 |
| 2,918,648 | 12/1959 | Ludman | 324—158 |
| 2,974,275 | 3/1961 | Haviland | 324—158 |
| 3,011,379 | 12/1961 | Corwin | 324—158 |
| 3,192,307 | 6/1965 | Lazar | 339—17 XR |

OTHER REFERENCES

Gerald Walker: Advances in Electronic Circuit Packaging, vol. 2, copyright 1962, pp. 101–102.

RUDOLPH V. ROLINEC, *Primary Examiner.*

WALTER L. CARLSON, *Examiner.*

E. L. STOLARUN, *Assistant Examiner.*